(12) United States Patent
Kouta et al.

(10) Patent No.: US 7,076,125 B2
(45) Date of Patent: Jul. 11, 2006

(54) OPTICAL CIRCUIT ELEMENT AND PRODUCTION METHOD THEREFOR, ARRAY-FORM OPTICAL CIRCUIT ELEMENT, OPTICAL CIRCUIT DEVICE USING IT

(75) Inventors: Hikaru Kouta, Minato-ku (JP); Mikio Oda, Minato-ku (JP); Tadahiko Hanada, Minato-ku (JP); Taro Kaneko, Minato-ku (JP); Yutaka Urino, Minato-ku (JP)

(73) Assignee: NEC Corporation, Tokyo (JP)

( * ) Notice: Subject to any disclaimer, the term of this patent is extended or adjusted under 35 U.S.C. 154(b) by 169 days.

(21) Appl. No.: 10/469,287

(22) PCT Filed: Feb. 28, 2002

(86) PCT No.: PCT/JP02/01828

§ 371 (c)(1),
(2), (4) Date: Feb. 13, 2004

(87) PCT Pub. No.: WO02/073256

PCT Pub. Date: Sep. 19, 2002

(65) Prior Publication Data

US 2004/0131302 A1 Jul. 8, 2004

(30) Foreign Application Priority Data

Feb. 28, 2001 (JP) ............................... 2001-54694

(51) Int. Cl.
G02B 6/12 (2006.01)
H01L 21/00 (2006.01)
B29P 11/00 (2006.01)

(52) U.S. Cl. ......................... 385/14; 385/44; 385/88; 385/129; 385/130; 385/131; 438/29; 438/31; 264/1.24; 264/125

(58) Field of Classification Search ............... 385/14, 385/44, 45, 129, 130, 131, 132, 88, 92; 438/29, 438/30, 31, 32; 264/1.24, 1.25, 1.21, 2.5
See application file for complete search history.

(56) References Cited

U.S. PATENT DOCUMENTS 5,389,312 A * 2/1995 Lebby et al. .............. 264/1.24

(Continued)

FOREIGN PATENT DOCUMENTS

JP 4-155983 A 5/1992

(Continued)

*Primary Examiner*—Brian Healy
(74) *Attorney, Agent, or Firm*—Sughrue Mion, PLLC

(57) ABSTRACT

The present invention relates to a device and a method for monitoring each of the propagated light beams that are propagated in each waveguide of an arrayed waveguide device and a method of fabricating the device. In the prior art, problems were encountered in deriving monitor light and photodetecting the derived monitor light within the waveguide substrate. In the present invention, waveguide directional couplers are formed in the spaces between the arrayed waveguides to derive a portion of the propagated light as monitor light. Cavities are provided at the ends of auxiliary waveguides connected to the directional couplers, and monitor light is guideded into these cavities. The monitor light, after being reflected upward or downward of the substrate by optical path conversion elements installed inside the cavities, is photodetected by photodiodes. The optical path conversion elements can be fabricated by inserting metal bumps into the cavities and then forming the bumps with a mold.

40 Claims, 17 Drawing Sheets

U.S. PATENT DOCUMENTS

| | | | |
|---|---|---|---|
| 5,710,854 A | * | 1/1998 | Myers et al. ............... 385/132 |
| 6,050,110 A | * | 4/2000 | Yoshida et al. ............. 65/406 |
| 2004/0131302 A1 | * | 7/2004 | Kouta et al. ................. 385/14 |
| 2004/0234224 A1 | * | 11/2004 | Ishizaki et al. ............. 385/129 |

FOREIGN PATENT DOCUMENTS

| | | |
|---|---|---|
| JP | 5-264870 A | 10/1993 |
| JP | 6-38860 A | 2/1994 |
| JP | 6-123803 A | 5/1994 |
| JP | 6-265738 A | 9/1994 |
| JP | 6-281837 A | 10/1994 |
| JP | 7-159658 A | 6/1995 |
| JP | 9-113743 A | 5/1997 |
| JP | 2687859 B2 | 8/1997 |
| JP | 10-82925 A | 3/1998 |
| JP | 10-206911 A | 8/1998 |
| JP | 10-300961 A | 11/1998 |
| JP | 11-326662 A | 11/1999 |
| JP | 2000-189043 A | 7/2000 |
| JP | 2000-221347 A | 8/2000 |

* cited by examiner

OPTICAL CIRCUIT ELEMENT AND PRODUCTION METHOD THEREFOR, ARRAY-FORM OPTICAL CIRCUIT ELEMENT, OPTICAL CIRCUIT DEVICE USING IT

BACKGROUND OF THE INVENTION

1. Field of the Invention

The present invention relates to an optical circuit element and optical circuit device for monitoring light that is propagated in a main waveguide, to a method of fabricating the element and device, and to a method of fabricating a micropyramid mirror for diverting the optical path of light that is transmitted from a waveguide. The micropyramid mirror of the present invention is widely applied as an element for coupling light propagated in a waveguide or optical fiber with a photo-detecting or light-emitting element of a component such as a photodiode or laser diode in mixed optical/electrical circuits that incorporate both optical and electrical elements.

2. Background Art

With the popularization of wavelength-division multiplexing communication in recent years, waveguides in optical circuit devices are also being constructed to enable multichannel communication. It has therefore become extremely important to monitor optical signals, to monitor wavelength, and to monitor power for the purpose of error detection for determining whether the optical signal of each channel is being propagated properly in each waveguide and to check the level of optical power that is being propagated. Methods are currently adopted in which a waveguide directional coupler (for example Japanese Patent Laid-Open No. H10-206911) or a Y-branching waveguide (for example Japanese Patent Laid-Open No. H9-113743) is provided to branch a beam of light, the optical signal that is delivered from the end of the device being coupled to an optical fiber and received by photodiode and then monitored.

In the case of a waveguide device in which the propagated light is transmitted in multiple channels, methods have been adopted in which optical fibers are coupled to a waveguide device, a fiber coupler (for example Japanese Patent Laid-Open Publication No. H6-281837) is provided in a following stage, a portion of the power of the propagated light is derived as monitoring light, and this monitoring light then detected by means of a photodiode.

Several methods have been proposed for diverting the optical path of light that is propagated in a waveguide outside the waveguide plane. For example, a method is disclosed in Japanese Patent Laid-Open No. H4-155983 in which a (111) surface that has been formed by anisotropic etching of silicon is used to reflect upward light that is delivered from a waveguide. Alternatively, Japanese Patent Laid-Open No. H6-265738, Japanese Patent Laid-Open No. H11-326662, and Japanese Patent Laid-Open No. 2000-221347 disclose methods in which the exit end surface of a waveguide or any portion of a waveguide is etched at an angle and light is reflected in an upward direction with respect to the substrate on which the waveguide is formed. Japanese Patent Laid-Open No. H10-300961 discloses a method for fabricating a surface that reflects light in an upward direction by using a blade to directly cut the waveguide at 45 degrees and grinding the cut surface. Japanese Patent Laid-Open No. H7-159658 describes a method of mounting a prism inside the waveguide substrate and reflecting light in an upward direction. Still further, Japanese Patent No. 2687859 describes a technique in which a gold coat is applied to the surface of a spherical microlens, this lens is secured in the waveguide exit end surface through the use of a silicon etch-pit to reflect light in an upward direction. Finally, Japanese Patent Laid-Open No. 2000-189043 proposes a technique in which a micropyramid mirror, formed by transfer of silicon etch-pits, is mounted on a waveguide substrate to reflect light in an upward direction.

With the progress of multiplexing in wavelength-division multiplexing communication in recent years, the number of channels that are transmitted by waveguides in a single optical circuit device has also increased. For example, in an arrayed waveguide grating (AWG) that demultiplexes and multiplexes the wavelengths of light that is propagated in an optical fiber, the number of the input/output ports successively increases, in terms of the number of channels, from 8 channels and 16 channels to 40 channels, 80 channels, and 160 channels. When monitoring a light signal in each of the channels, a monitor method that employs a fiber coupler could be applied for up to 16 channels. With 40 or more channels, however, the routing of the optical fibers for monitoring after branching becomes extremely problematic, leading to an increase in the overall dimensions of the optical circuit device and an inability to adapt to the system needs. In addition, the high cost of fiber couplers entails the cost of a waveguide device having a monitor to increase in proportion to the number of channels. This poses serious problems, and developing a method of monitoring light that employs a method other than fiber couplers has therefore become a key issue.

Arrayed waveguides that apply to multichannel communication are generally formed on the same plane. Although it is possible to provide waveguide directional couplers between arrayed light-propagating waveguides and then derive the waveguide light and monitor light from the waveguide exit surfaces, photodiodes must be coupled to the ends of optical fibers after coupling the optical fibers. The routing of the optical fibers is therefore problematic.

As one means that can be considered for solving this problem, the monitor light can be diverted by waveguide directional couplers or Y-branching waveguides located between the arrayed waveguides, following which optical path conversion elements can be used to derive the monitor light from the plane on which the waveguides are formed.

In the method reported in the past of using a silicon etched surface for these optical path conversion elements, it is not possible to form silicon etch pits exclusively in portions between array waveguides to reflect light. A method can be considered in which a silicon anisotropic etched surface is cut for use as an optical path conversion element, but this approach is not practical due to problems regarding the number of processing steps, and the methods of mounting, securing, and positioning. Further, a method in which the waveguides are etched at an angle to cause light to reflect in a direction perpendicular to the substrate and a method of using a blade to directly cut the waveguide to 45 degrees and grinding the cut surface are also rendered impractical due to the extreme difficulty of processing exclusively the portions between waveguides that are formed in arrays. While a method may be employed in which microprisms are mounted between the waveguides, this method is impractical due to the extreme difficulty of forming microprisms of a size around 125 μm that is a distance between the waveguides, as well as to the demerit of cost. An optical path conversion element, proposed in Japanese Patent No. 2687859, in which a gold coat is applied to the surface of a microlens is difficult to apply, because a technique for applying a uniform gold coat to spherical grains on the order of 100 µm has not been established.

Further, when monitor light that is supplied from auxiliary waveguides provided between main waveguides is derived from waveguide exit surfaces together with propagated light, the fibers for the propagated light and the fibers for the monitor light must be alternately arranged in an array. In this case, since the diameter of the optical fibers that connect to the optical circuit device is 125 µm, the pitch of the array of the fibers for the propagated light cannot be reduced to 250 µm or less. In addition, the necessity for space to separate the fibers for propagated light and monitor light prevents the miniaturization of the monitor function part in an optical circuit device for multichannel communication.

SUMMARY OF THE INVENTION

The optical circuit element according to the present invention includes, on a substrate, a main waveguide and at least one auxiliary waveguide for branching a portion of the light propagated in the main waveguide, wherein a cavity is formed at the terminated portion of the auxiliary waveguide, and a mirror is installed in the cavity for reflecting light propagated in the auxiliary waveguide and delivered into the cavity. In this case, a photodetecting element for receiving the light reflected by the mirror may be provided above the cavity, and the space in the cavity between the terminated portion of the auxiliary waveguide and the photodetecting element may be filled with a light-transmissive substance having a refractive index that matches to within ±1% the refractive index of the core of the auxiliary waveguide. In addition, the mirror may be formed in a concave shape.

The optical circuit element of the present invention is further capable of detecting light intensity or light wavelength to monitor an optical signal by means of a photodetecting element. In order to perform this operation, the monitoring of the optical signal can be effected by providing two or more auxiliary waveguides for a single main waveguide and detecting the light intensity or the optical wavelength in each of the auxiliary waveguides using a photodetecting element. A directional coupler or a Y-branching waveguide may be used as a means for branching a portion of the propagated light.

The optical circuit element according to the present invention can be further applied in arrayed optical circuit elements in which a plurality of optical circuit elements each having a main waveguide are provided on a substrate, thus constituting arrayed optical circuit elements. In this case, the spacing of the main waveguides may be wider at least at the positions at which the cavities of the auxiliary waveguides are provided than at other positions. Alternatively, the light from a plurality of adjacent auxiliary waveguides may be delivered into a single cavity and this light then reflected by a mirror provided in the cavity. The mirror that is provided in the cavity may be a single mirror that reflects a plurality of light beams.

The optical circuit device according to the present invention may be provided with: arrayed optical circuit elements according to the present invention; at least one of an optical signal demultiplexer element and an optical signal multiplexer element; and/or an optical processing element having a means for monitoring the plurality of light beams that are transmitted into the cavity and controlling the light intensity of an optical signal depending on the light intensity that is thus monitored. In this case, the optical processing element may be made up from a means for attenuating or amplifying for every optical signal.

The optical circuit element fabrication method according to the present invention is a method of fabricating an optical circuit element that includes, on a substrate, a main waveguide and at least one auxiliary waveguide for branching a portion of the light propagated in the main waveguide; a cavity formed at the terminated portion of the auxiliary waveguide; and a mirror installed in the cavity for reflecting light delivered into the cavity.

This method includes steps of: stacking a clad layer material and a core layer material on a substrate, patterning the core layer, and then forming an upper clad layer, to provide a main waveguide and an auxiliary waveguide; carrying out etching to form a cavity at the terminated portion of the auxiliary waveguide; and forming a mirror in the cavity. The process of forming a mirror includes steps of: providing mirror mounting material on the bottom surface of the cavity; inserting a mirror forming material on the mirror mounting material; and forming the mirror forming material using a mold. The step of inserting mirror forming material in the cavity and the step of using a mold to form the mirror forming material may be performed at the same time, and the mold may include a hole for charging the inside of the mold with the mirror forming material.

The optical circuit element fabrication method according to the present invention is a method of fabricating an optical circuit element that includes, on a substrate, a main waveguide and at least one auxiliary waveguide for branching a portion of the light propagated in the main waveguide; a cavity formed at the terminated portion of the auxiliary waveguide; and a mirror installed in the cavity for reflecting light propagated in the auxiliary waveguide and delivered into the cavity. This method includes steps of: stacking a clad layer material and a core layer material on a substrate, patterning the core layer, and then forming an upper clad layer to provide the main waveguide and the auxiliary waveguide; forming a cavity at the terminated portion of the auxiliary waveguide by etching; and forming a mirror in the cavity. The step of forming a mirror includes a step of providing a mirror mounting thin-film material on the bottom surface of the cavity and a step of charging the interior of a mold with mirror forming material and then transferring the mirror forming material onto the mirror mounting material. The above-described mirror mounting material may be a metal pad, in which case the step of forming a mirror may further include a step of using at least one of thermocompression bonding, ultrasonic bonding, solder bonding, and chemical bonding of the metal pad material and mirror forming material to secure the metal pad and the mirror forming material.

In the optical circuit element fabrication method according to the present invention, the mold may be constituted by the surfaces obtained by anisotropic etching of a silicon crystal, mirrors may be simultaneously formed in a plurality of cavities using a plurality of molds, and the mirror forming material may be a metal that contains at least 90% gold.

Further, the optical circuit element fabrication method according to the present invention is a method of fabricating an optical circuit element that includes: on a substrate, a main waveguide and at least one auxiliary waveguide for branching a portion of the light propagated in the main waveguide; a cavity formed at the terminated portion of the auxiliary waveguide; and a mirror installed in the cavity for reflecting light that is propagated in the auxiliary waveguide and delivered into the cavity. This fabrication method includes steps of: stacking a clad layer material and a core layer material on the substrate, patterning the core layer, and then forming an upper clad layer to provide the main waveguide and the auxiliary waveguide; forming a cavity at the terminated portion of the auxiliary waveguide by etching; and forming a mirror in the cavity. The step of forming a mirror includes a step of arranging a mirror that has been mounted on a submount substrate. The above-described step of forming a mirror may further include a step of providing a thin-film material for mounting the mirror on the bottom surface of the cavity before the step of arranging the mirror that has been installed on a submount substrate. The submount substrate may be made of a metal or may be constituted by a substrate having a metal thin-film on its lower surface.

Further, in the fabrication method of an optical circuit element that is provided with a mirror having a concave surface according to the present invention, a mold having a convex surface may be used to form the mirror, and a step may be provided of using a shaping tool having a convex surface to modify the shape of a formed mirror so as to convert the reflecting surface to a concave surface.

The waveguide spacing in arrayed waveguides is generally determined by the diameter of the optical fibers that couple the device. Since the diameter of a single-mode fiber including a clad portion is 125 µm, the spacing of the core centers of a fiber array is therefore approximately 125 µm. The spacing between core centers of waveguides that are formed on a substrate for coupling this fiber array and the waveguide end surface of a waveguide device is also approximately 125 µm. Since the core diameter of a single-mode waveguide is on the order of 4~8 µm, the spacing between array waveguides is approximately 117~121 µm. A waveguide directional coupler or Y-branching waveguide can be formed in this space and a portion of the light propagated in the waveguide can then be guided into the space between waveguides. The branching ratio can be freely designed by changing the shape of the directional couplers or Y-branching waveguides. By etching the terminated portion of the waveguide that follows such a directional coupler or the Y-branches into a concave shape at a position that does not interfere with other waveguides, the monitor light, which is a portion of the propagated light, can be derived from the side surfaces of a cavity and into the cavity space. Light can be reflected outside the plane of the waveguide by installing an optical path conversion element in this cavity, and further, the intensity of the propagated light or optical signal in the arrayed waveguides can be monitored by using a photodiode to monitor this reflected light. To check whether light of the correct wavelength has been assigned to a prescribed channel after an AWG has been used to disperse wavelength-multiplexed light, monitor light can be guided to a spectral analyzer or guided to a photodiode provided with a window transmissive of only a particular specific wavelength.

The micropyramid mirror proposed in Japanese Patent Laid-Open Publication No. 2000-189043 is formed by transferring a metal thin-film that has been formed on an etch-pit surface created by anisotropic etching of silicon. This mirror has excellent surface accuracy and can be installed at a prescribed position regardless of the substrate type and can therefore be applied as an optical path conversion element to be installed in the space between arrayed waveguides. As a method of mounting this mirror in a concave portion between waveguides, it is preferred that a mold material, which is provided with an etch-pit of silicon for forming the mirror, is processed into a convex shape so as to be inserted into a cavity. A plurality of the parts of such a convex shape can be provided on a single mold material, wherein the positions and number of these convex parts coincide with the positions and number of the mirrors that are required. This method enables the batch installation of micropyramid mirrors in cavities of the optical circuit device.

Alternatively, instead of the micropyramid mirror that is proposed in Japanese Patent Laid-Open Publication No. 2000-189043, a micropyramid mirror can be formed inside a cavity by first securing a metal bump in the cavity by a method such as wire bonding and then using the above-described silicon etch-pit mold member that has been processed into a convex shape as a forming mold. A concave mirror can also be obtained by using a tool with a convex surface to press the surface for reflecting light. A concave mirror can condense the reflected light and thus enable coupling to an optical fiber for guiding the light to a photodiode or spectroscope having a small photodetecting area. In addition, this concave mirror can be used to condense the light that has been emitted from a surface-mounted laser diode and has been spread, to a waveguide.

The above-described optical circuit element, optical circuit device, and methods of fabricating these components are not limited to an optical circuit device for monitoring that employs a waveguide, but can also be applied to, for example, a substrate on which optical elements and electrical elements are mixed, to an optical circuit substrate in which optical fibers are routed, or to an optical coupling circuits between three-dimensional optical circuit substrates.

In the present specification, the term "pyramid shape" is collectively applied to forms that are equal or similar in shape to the shape of an etch-pit obtained by anisotropic etching of a silicon crystal, and this form is described as a "micropyramid mirror."

BEST MODE FOR IMPLEMENTING THE INVENTION

Explanation is next presented regarding specific modes of implementing the present invention with reference to the figures.

WORKING EXAMPLE 1

Figure 1:
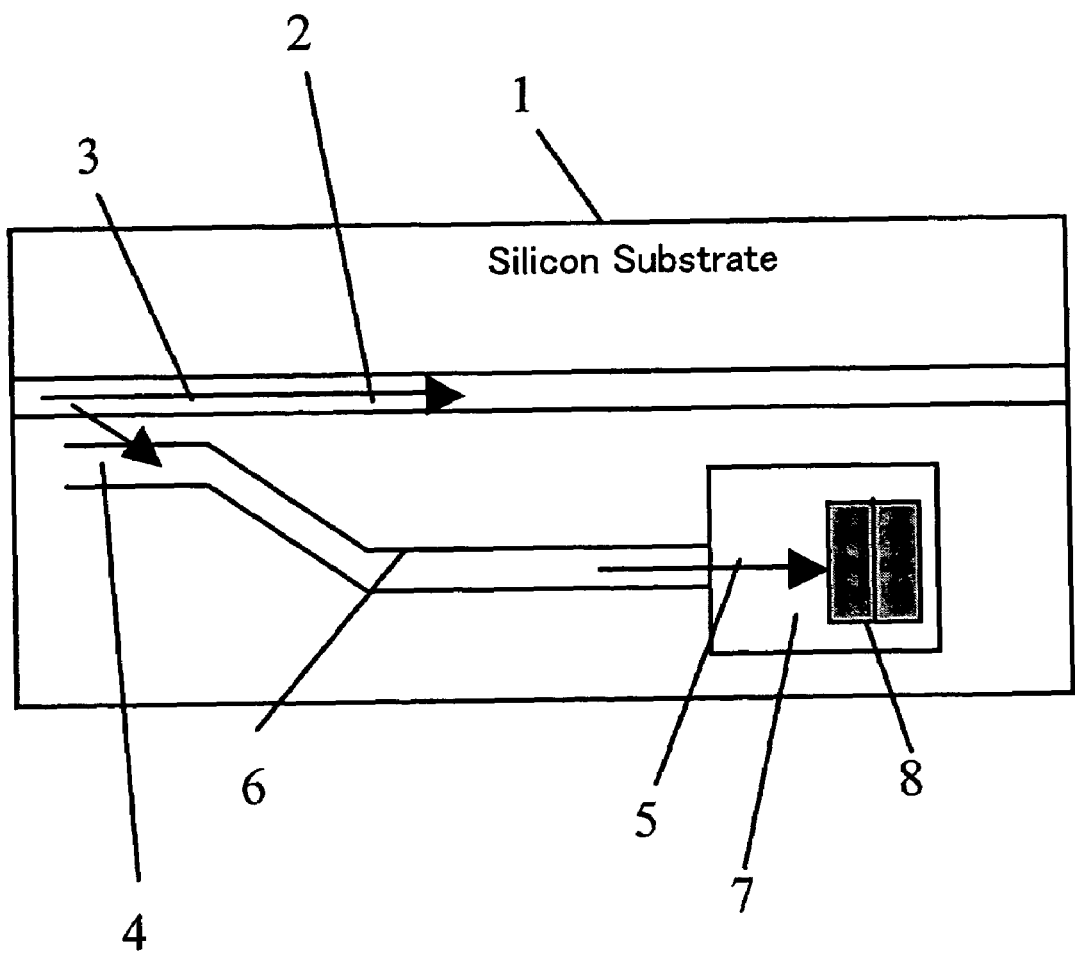
FIG. 1 is a plan view of an optical circuit element capable of deriving a portion of the propagated light propagated in a main waveguide to an auxiliary waveguide by means of a directional coupler and reflecting the light out of the plane of the waveguide by means of an optical path conversion element.
Figure 2:
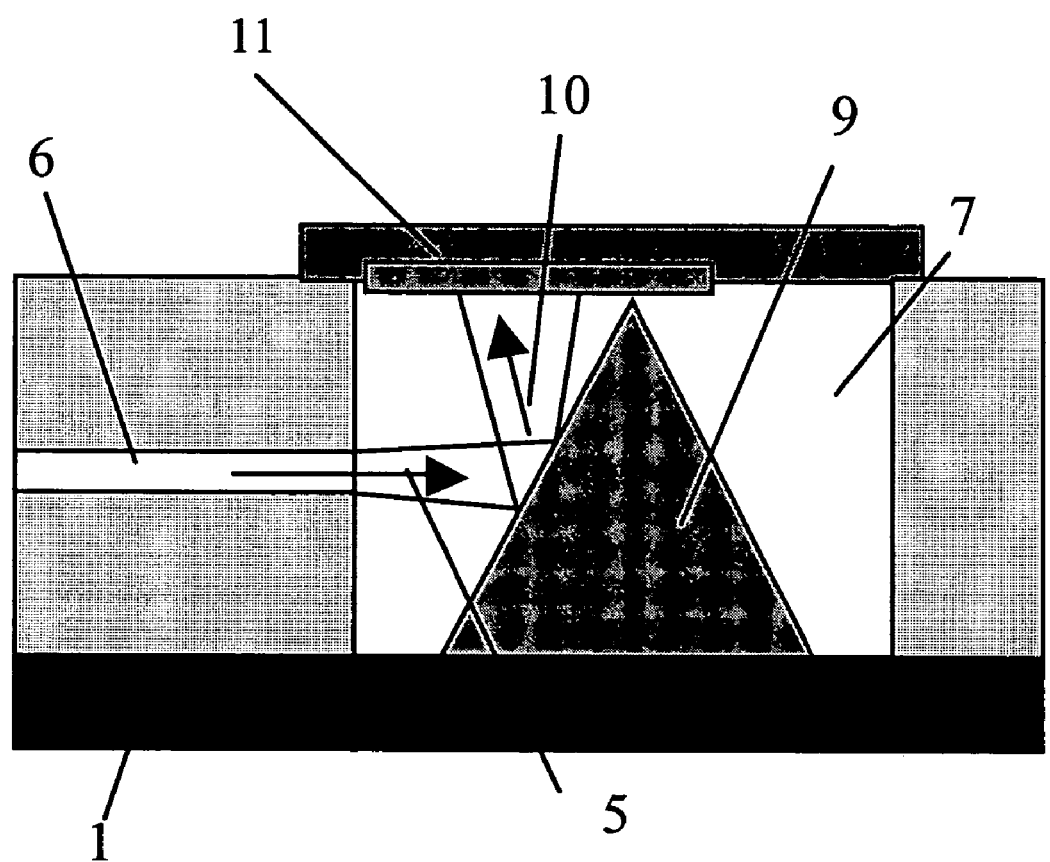
FIG. 2 is an explanatory view showing an aspect in which light delivered into a cavity from an auxiliary waveguide is reflected by a micropyramid mirror and received by a photodiode.

As shown in FIG. 1, main waveguide 2 formed from silica glass and directional coupler 4 for deriving a part of propagated light 3 propagated in this main waveguide 2 are formed on silicon substrate 1. A part of the propagated light is branched to directional coupler 4 and propagates in auxiliary waveguide 6 succeeding directional coupler 4 as monitor light 5. Cavity 7 is provided at the terminated portion of the waveguide of directional coupler 4 for directing monitor light 5 outside the waveguide. Auxiliary waveguide 6 opens into cavity 7. Monitor light 5 emerges from auxiliary waveguide 6 into cavity 7 and is reflected by optical path conversion element 8 arranged inside cavity 7, whereby monitor light 5 can be derived outside the plane of the waveguide. FIG. 2 shows an example that uses micropyramid mirror 9 as optical path conversion element 8, and is an enlarged view of the vicinity of cavity 7 in FIG. 1 as seen from the side. Monitor light 5 that has emerged from auxiliary waveguide 6 is reflected by micropyramid mirror 9, whereby reflected light 10 can be received by photodiode 11 arranged above cavity 7. This construction of an optical circuit element enables to derive monitor light, which was derived from the side surface of the device in the prior art, from above the waveguide substrate.

WORKING EXAMPLE 2

Figure 3:
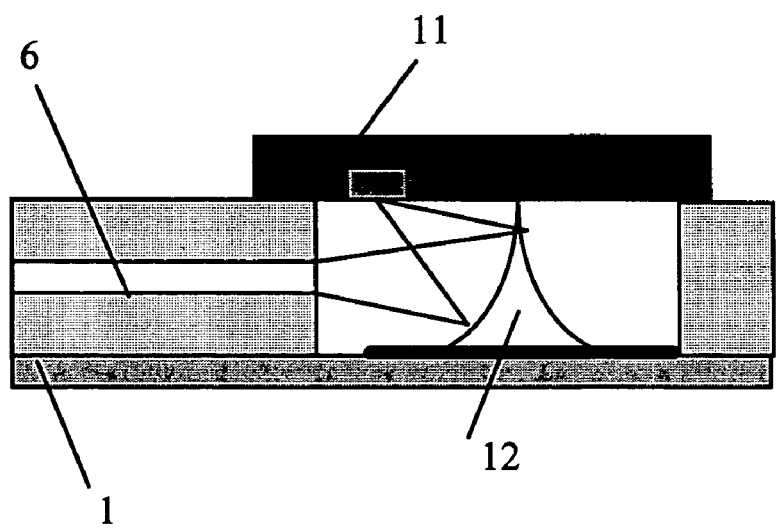
FIG. 3 is a sectional view of an optical circuit element in which light delivered into a cavity from an auxiliary waveguide is reflected by a concave mirror and received by a photodiode.

FIG. 3 shows an optical circuit device in which photodiode 11 having a light-receiving area of 10 μm in diameter is used to monitor an optical signal wherein the optical signal that propagates the waveguide in the optical circuit element of FIG. 1 is a high-speed signal having a frequency that exceeds 10 Gbps. The diameter of the core of the waveguide is 7 μm. Since the light that is transmitted from the waveguide core into the cavity has an angle of dispersion, it is impossible to detect all of the light that has been reflected by a planar mirror by means of a light-receiving surface having a diameter of 10 μm. Concave mirror 12 is therefore used to reflect the monitor light in the cavity to condense the reflected light to substantially the same 7 μm diameter as that of the core shape of the waveguide and to converge the light within the light-receiving surface. By investigating the relation between the shape of light that is focused on photodiode 11 and the aspect ratio of the concave surface of the micropyramid mirror and by then optimizing the shape of the concave surface, a substantially circular light beam having a diameter of 6 μm can be reflected onto the light-receiving surface of the photodiode.

WORKING EXAMPLE 3

Figure 4:
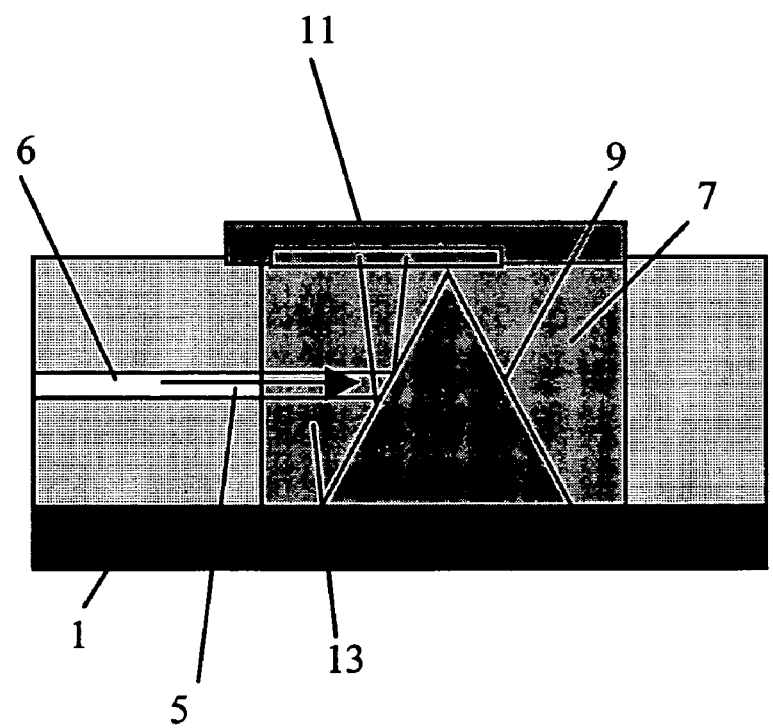
FIG. 4 is a sectional view of an optical circuit element in which the interior of a cavity is filled with a light-transmissive substance to suppress the angle of spread of monitor light.

To restrict the angle of dispersion of monitor light 5 that emerges from auxiliary waveguide 6 into cavity 7, the space in the cavity surrounding the micropyramid mirror (in which the optical path of the monitor light between the exit of auxiliary waveguide 6 and the photodiode is established) is filled with silicone resin, as shown in FIG. 4. The silicone resin is light-transmissive substance 13 having a refractive index equal within ±1% to the equivqlent refractive index of auxiliary waveguide 6. As a result, the angle of dispersion of the monitor light that is supplied into the cavity is restricted and the diameter of the monitor light beam on the light-receiving surface of photodiode 11 following reflection by micropyramid mirror 9 can be limited to 10 μm. Further, by reflecting this rectilinearly propagated light by concave mirror 12, the reflected light can be focused to the limits of diffraction (on the order of approximately 2 μm).

The properties that are required to this light-transmissive substance 13, must be of low surface tension and low viscosity so that the substance can be solidified in the cavity to prevent flow after charging. In addition, the rate of volumetric change before and after solidification must be as close as possible to 1, and the expansion coefficient with respect to temperature is also preferably low after solidification. As a result of investigation of materials with these considerations in mind, it was found that a silicone gel that was synthesized by ring-opening polymerization of dimethylcyclohexane had the necessary properties. It was found that the refractive index could be adjusted according to the proportion of bridged bonds with benzoyl peroxide. Thus, two types of silicone gel were prepared having refractive indices of 1.4 and 1.5 in advance, and these silicone gels were mixed at a proportion of 4:6 to achieve a refractive index of 1.46, whereby the effective refractive index could be matched to that of the waveguide within the order of ±1%. The result of an assessment of the long-term reliability at high temperature and high humidity of an optical circuit device, the cavity of which was filled with this light-transmissive substance, revealed that suppression of the deterioration of the reflecting surface and light-receiving surface was enabled compared with a case in which the light-transmissive substance was not used. As a result, it was found that endurance to as much as 100,000 hours of use was attained, thereby yielding an increase of more than 30% in reliability

WORKING EXAMPLE 4

Figure 5:
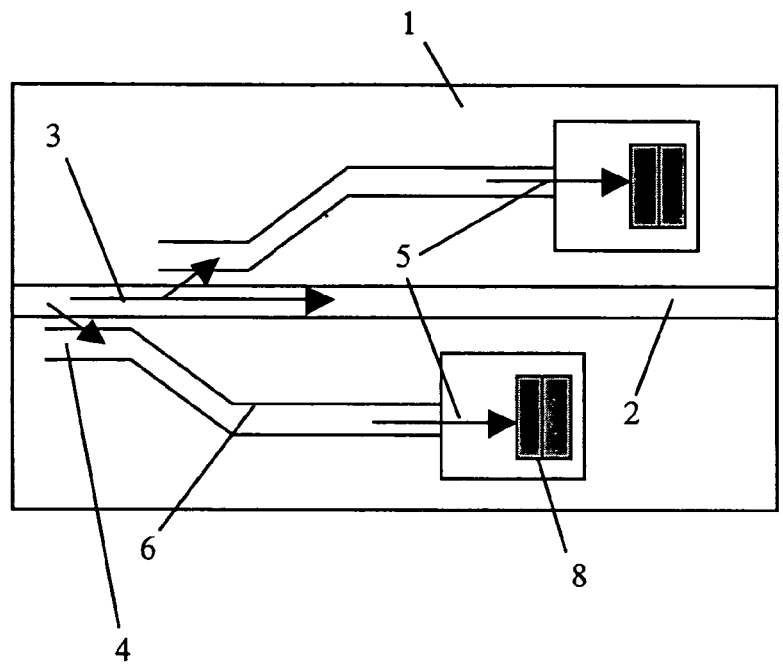
FIG. 5 is a plan view of an optical circuit element in which monitor light is guided from a single main waveguide to two auxiliary waveguides.
Figure 6:
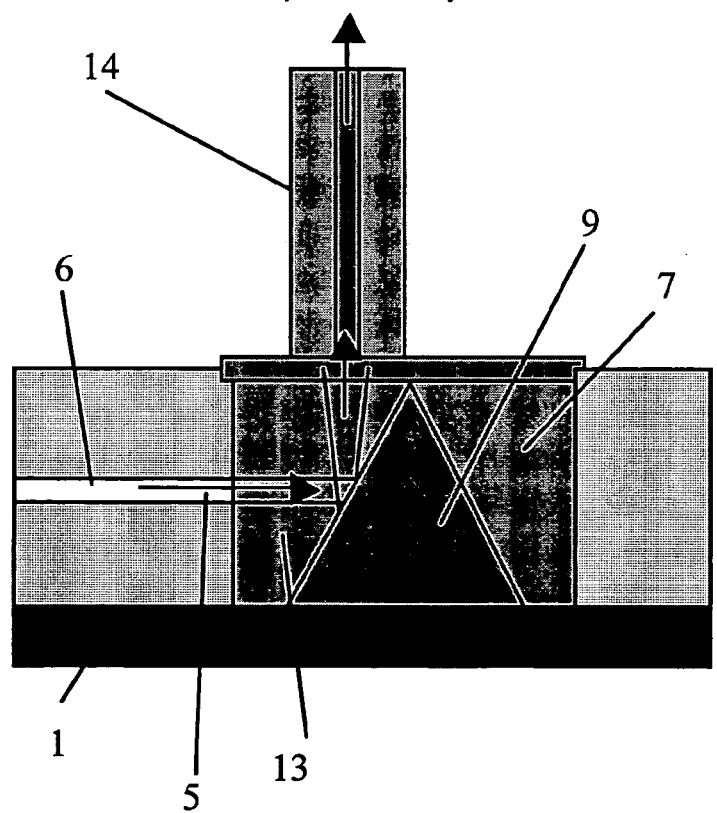
FIG. 6 is a sectional view of an optical circuit element capable of guiding monitor light to a spectral analyzer by an optical fiber.

As shown in FIG. 5, an optical circuit element can be formed in which two auxiliary waveguides 6 are provided for a single main waveguide 2, the light from one auxiliary waveguide 6 being used to monitor light intensity and the light from the other auxiliary waveguide 6 being used to monitor wavelength. As shown in FIG. 6, light reflected by a micromirror is directed to optical fiber 14, and this fiber is coupled to a spectral analyzer to allow wavelength monitoring. After an AWG is used to demultiplex a multiplexed optical signal, a wavelength monitor functions effectively as a means of checking that each wavelength has been distributed to a prescribed channel.

WORKING EXAMPLE 5

Figure 7:
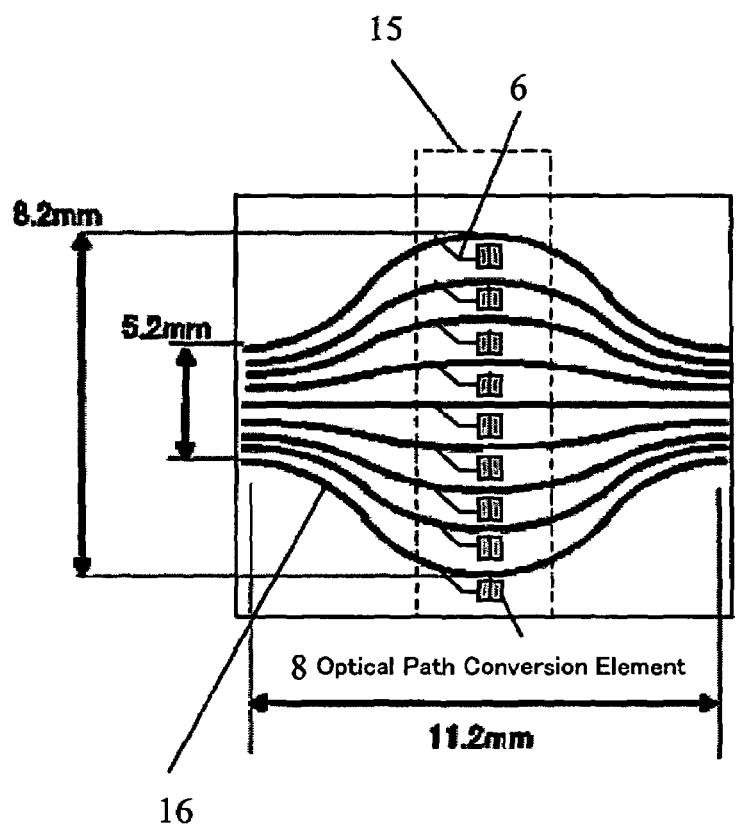
FIG. 7 is a plan view of an optical circuit element in which light monitor parts are provided in a fan-out portion.

The diameter of a single-mode optical fiber including the cladding is approximately 125 μm. The spacing of the cores of a single-mode array fiber is therefore also 125 μm, and the cores of the waveguide array must be formed with the same spacing as the fiber array to couple an arrayed waveguide with arrayed fiber at high-density. When an optical path conversion element and a waveguide directional coupler or Y-branching waveguide for deriving monitor light are provided with this approximately 125 μm pitch, a limit must be placed on the size of the optical path conversion element. However, in the case of a waveguide in which, for example, the index of refraction of the cladding is 1.45 and the index of refraction of the core is 1.46, the total width of 5.2 mm of the arrayed waveguide having 42 waveguides with a waveguide spacing of 125 μm can, over a 11.2 mm length of the sections of the arrayed waveguides, be spread once as wide as 8.2 mm and then bent back again to the width of 5.2 mm without loss of optical energy, as shown in FIG. 7 (the figure shows only nine of the 40 light propagating waveguides). By forming this type of fan-out waveguide 16, the waveguide spacing can be spread to as much as 195 μm. A larger area can therefore be provided to mount the optical path conversion elements for deriving monitor light that is guided between waveguides, and this increased width can be used as light-monitoring portion 15 to allow an easing of the restrictions on the size of auxiliary waveguides 6, optical path conversion elements 8, and photodiodes (not shown in the figure). As a result, the yield and costs of fabricating an optical circuit device can be improved.

WORKING EXAMPLE 6

Figure 8:
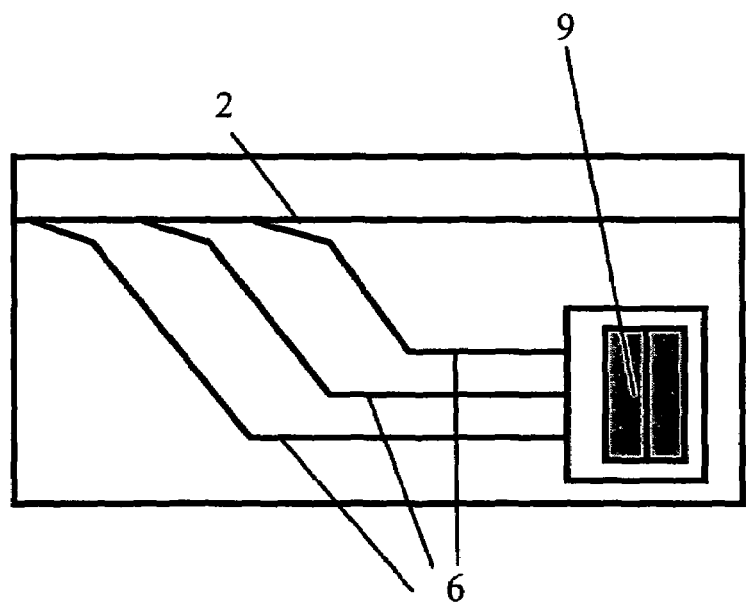
FIG. 8 is a plan view of an optical circuit element in which three auxiliary waveguides are formed branching from a single main waveguide and in which monitor light-can be reflected upward by a single mirror.
Figure 9:
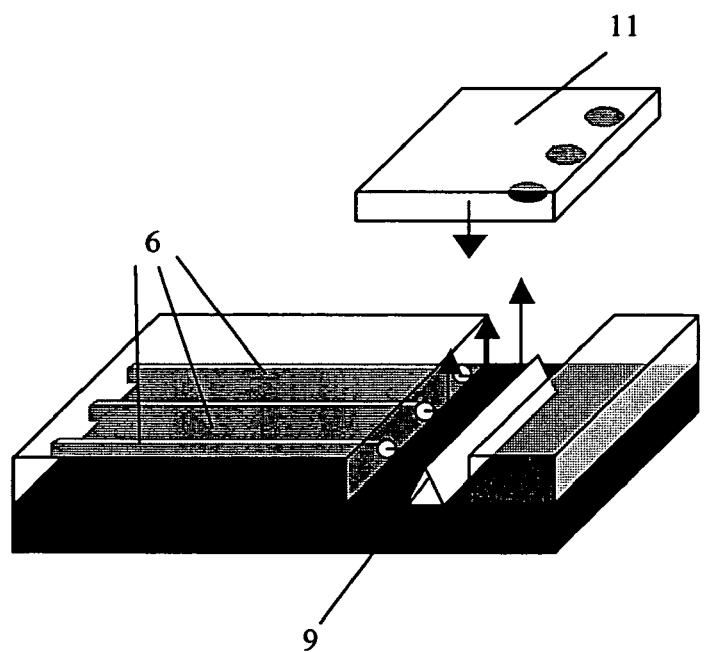
FIG. 9 is a structural view of an optical circuit element in which three monitor light beams reflected by a single mirror are each received by a respective photodiode in an array of three photodiodes.

FIG. 8 shows an optical circuit element in which three auxiliary waveguides 6 are provided, each Y-branched from main waveguide 2. The light that is propagated in each of these auxiliary waveguides is released into a single cavity, whereby these three beams of light can then be reflected upward by one micropyramid mirror 9 provided in the cavity. This mode allows the optical paths of light beams emerged from a plurality of auxiliary waveguides to be diverted to an upward direction all at once by a single mirror and then monitored. As shown in FIG. 9, monitoring can be realized effectively and in reduced space by mounting array photodiode 11, which can monitor the intensity, optical signal, and specific wavelength of the monitor light, over micropyramid mirror 9.

WORKING EXAMPLE 7

Figure 10:
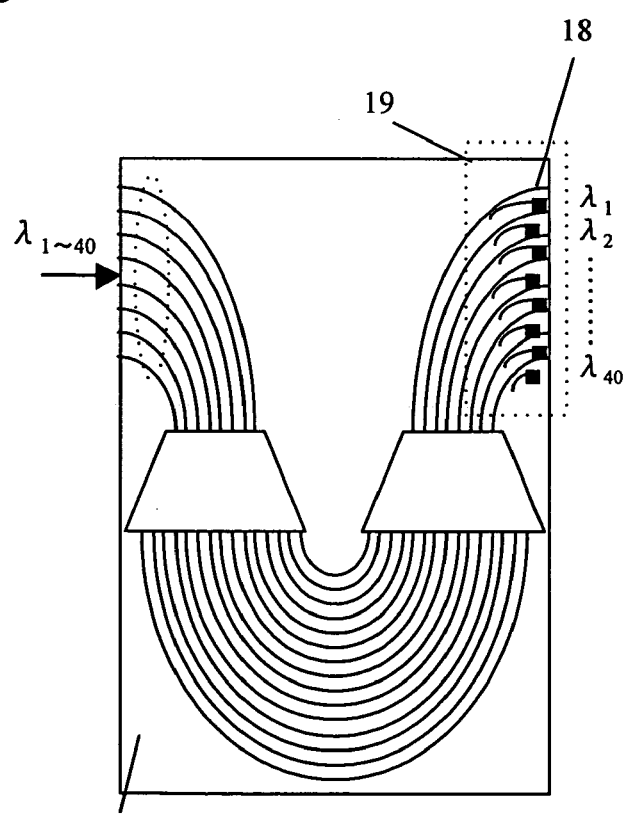
FIG. 10 is a plan view of an AWG that includes monitor functions in its output portion.

FIG. 10 shows an optical circuit device in which optical monitor portions 19 having the same composition as FIG. 1 are provided in the spaces between waveguides in output waveguide array 18 of 40-channel AWG 17. Light of 40 wavelengths having a central wavelength of 1.55 μm with spacing of 0.8-nm was propagated in an AWG with optical monitor that had been fabricated in this way, and after demultiplexing by means of the AWG, monitor light was photodetected by optical monitor portions 19 before output. The variation in output for each channel could be measured.

WORKING EXAMPLE 8

Figure 11:
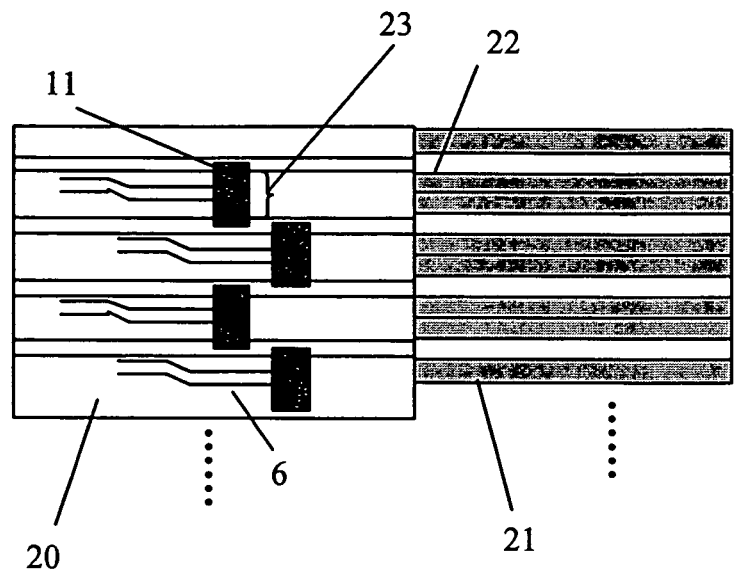
FIG. 11 is a plan view of a monitor chip bonded to an optical fiber array.
Figure 12:
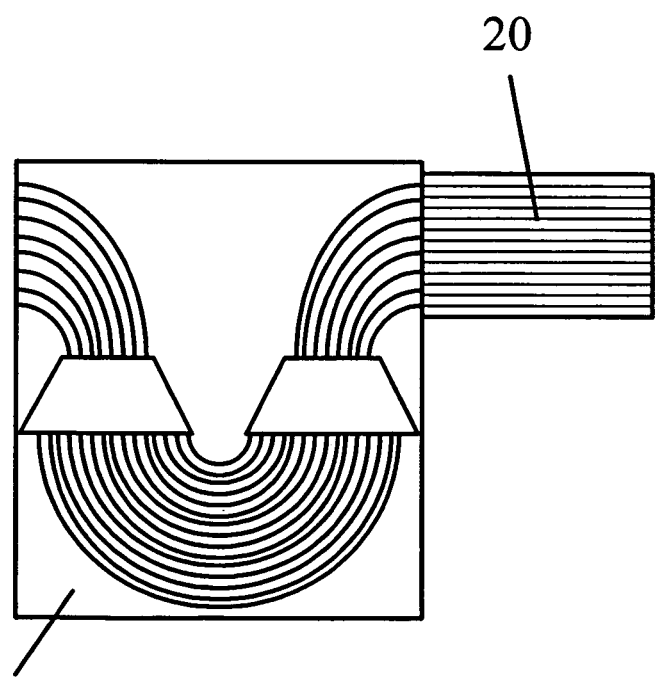
FIG. 12 is a plan view of an optical circuit device in which a monitor chip and an AWG have been integrally formed.

FIG. 11 shows monitor chip 20 (showing only a portion of the 40 channels) coupled with optical fiber array 21, monitor chip 20 having the monitor functions that were shown in FIG. 1 in between the arrayed waveguides for 40 channel that are formed on a silicon substrate. The fiber array spacing has a pitch of 129 μm, and the pitch of the arrayed waveguides is therefore also 129 μm. Since the waveguide cores were formed 5 μm square, the width of space 23 between waveguides was 124 μm. Waveguide directional couplers were formed in these spaces 23 between waveguides, and auxiliary waveguides 6 for extracting monitor light were formed so as to be positioned at the centers of the spaces between waveguides. Cavities for mounting the optical path conversion elements were formed 80 μm square, and are thus separated by approximately 20 μm from the waveguides for propagated light on both sides, and are etched to a depth of approximately 30 μm to the silicon substrate. Micropyramid mirrors having a height of 30 μm, and a length and width of 60 μm were then mounted in the forty cavities that had been formed in this way. In addition, forty photodiodes were mounted above the micropyramid mirrors in offset positions so as not to interfere with one another. By forming this monitor chip 20 as a single unit with AWG 17 as shown in FIG. 12, an AWG chip having monitor functions can be created.

WORKING EXAMPLE 9

Figure 13:
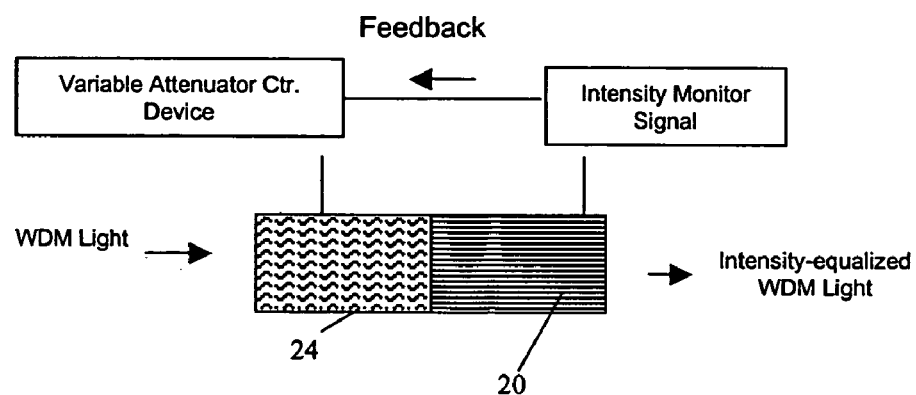
FIG. 13 is an explanatory view of an optical circuit device in which a monitor chip and an attenuator have been integrally formed.
Figure 14:
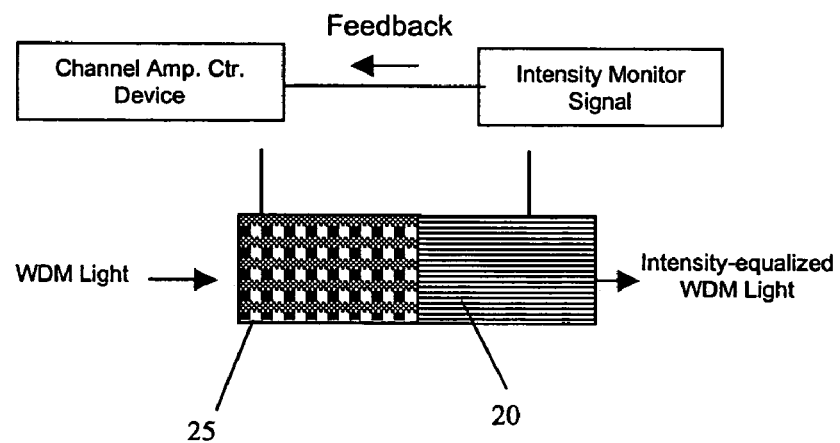
FIG. 14 is an explanatory view of an optical circuit device in which a monitor chip and a channel amplifier have been integrally formed.

FIG. 13 and FIG. 14 show chips in which arrayed waveguide monitor chip 20 of the present invention shown in FIG. 11 is integrally combined with variable attenuator 24 and channel amplifier 25, respectively. Providing feedback to an attenuator for attenuating or to a channel amplifier for amplifying the signals from the monitor chip enables the equalization of WDM light that exhibits variation in intensity in each channel. Providing the elements as a single unit facilitates handling of the chip and eliminates the need for fiber coupling between elements, whereby the mounting area and cost can be reduced.

WORKING EXAMPLE 10

Figure 15:
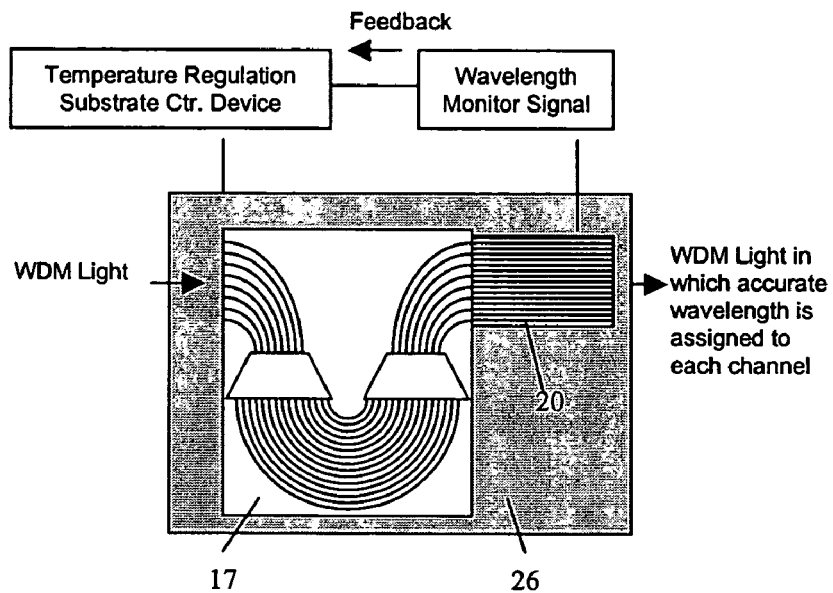
FIG. 15 is an explanatory view of an optical circuit device in which a monitor chip and a temperature-regulating substrate that incorporates with an AWG have been integrally formed.

A signal obtained by monitoring the wavelength of light propagated in the main waveguides of an arrayed waveguide device can be fed back to a temperature regulating device for controlling the assignment of demultiplexed wavelengths of AWG to each waveguide and thereby control the channel assignment of wavelengths. As shown in FIG. 15, feedback of the signal from wavelength monitor chip 20 to the temperature control device of AWG 17 that incorporates temperature regulation substrate 26 enables control of a WDM signal to have superior wavelength characteristics. As shown in FIG. 15, integral combination of AWG 17 and monitor chip 20 mounted on a temperature regulation substrate both eliminates the need for coupling fibers between chips and enables a 50% reduction of the mounting area.

COMPARATIVE EXAMPLE 1

Figure 16:
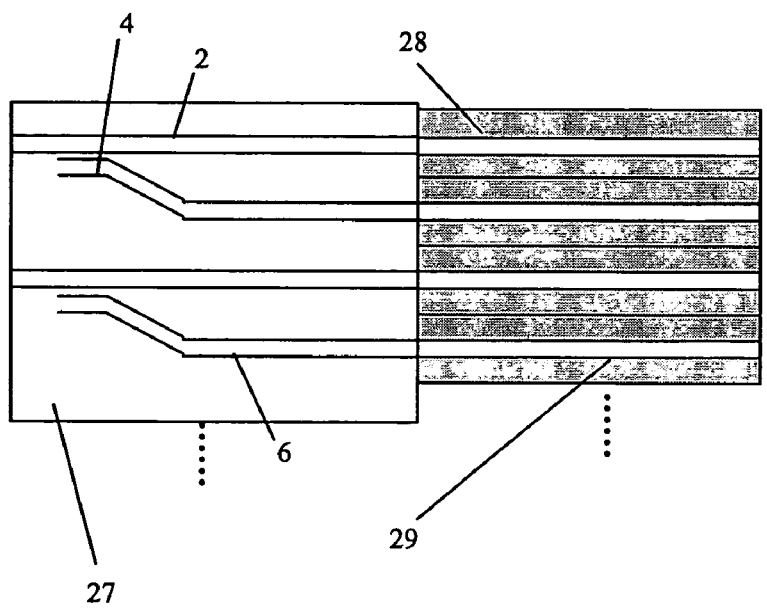
FIG. 16 shows an example of the prior art in which propagated light and monitor light branched by directional couplers are coupled to a fiber array.

FIG. 16 shows a case in which directional couplers 4 of the prior art are used to derive the propagated light of each channel in 40-channel optical circuit element 27 to auxiliary waveguides 6 between waveguides and then supply the light from the end surfaces of the waveguides (only a portion of the 40 channels is shown). In this method, fibers 28 for propagated light and fibers 29 for monitor light must be alternately arranged in an array, and space is also required for the portion in which the coupled optical fibers are divided between propagated light and monitor light.

In addition, photodiodes must also be coupled to the front ends of the fibers for monitor light, whereby the mounting area of the overall device is 50 times, and the cost is five times, that of monitor chip 20 of the present invention.

COMPARATIVE EXAMPLE 2

Figure 17:
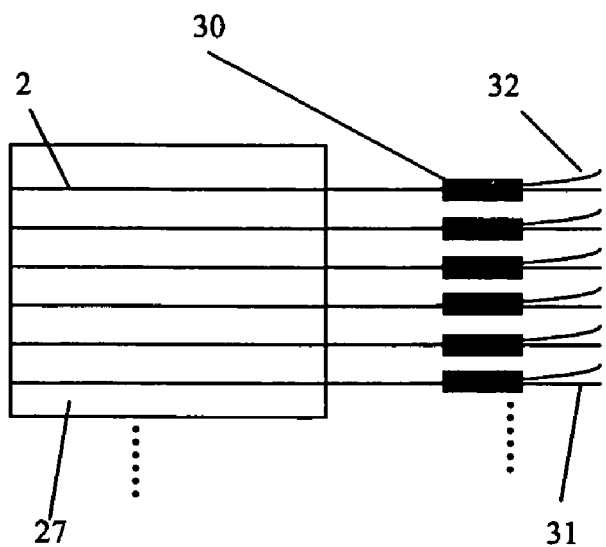
FIG. 17 shows an example of the prior art in which monitoring of an arrayed waveguide device is performed through the use of an optical fiber coupler.

FIG. 17 shows a method of the prior art in which propagated light, after being supplied from optical circuit element 27, is demultiplexed by optical fiber couplers 30 and branched to fibers 31 for propagated light and fibers 32 for monitor light (only a portion of the waveguides for 40 channels is shown). In this method, not only are the optical fiber couplers extremely expensive, but in addition, after the fibers that have been branched by the couplers are further divided between fibers for propagated light and monitor light, photodiodes must be coupled to the fibers for monitor light. An optical circuit element that is fabricated by this method has a mounting area that is 75 times larger, and cost that is 10 times higher, than the monitor chip of the present invention.

WORKING EXAMPLE 11

Figure 18:
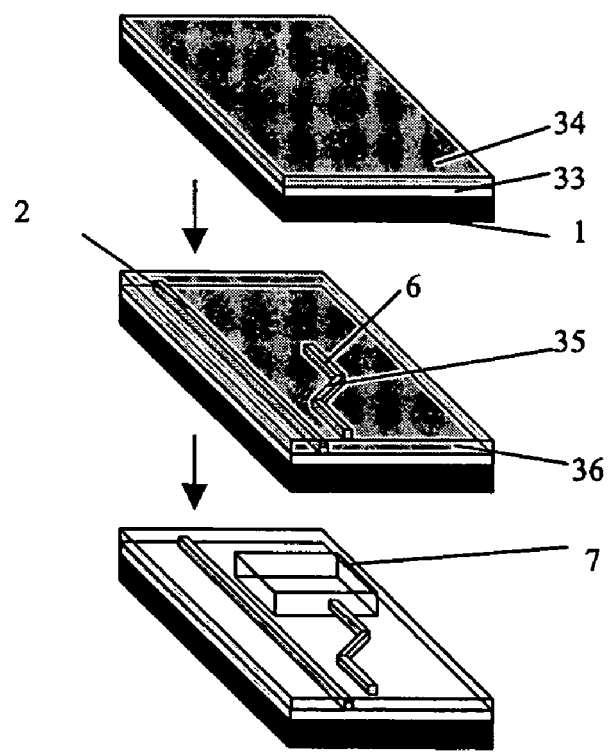
FIG. 18 shows the process of forming a waveguide substrate for a monitor chip.
Figure 19:
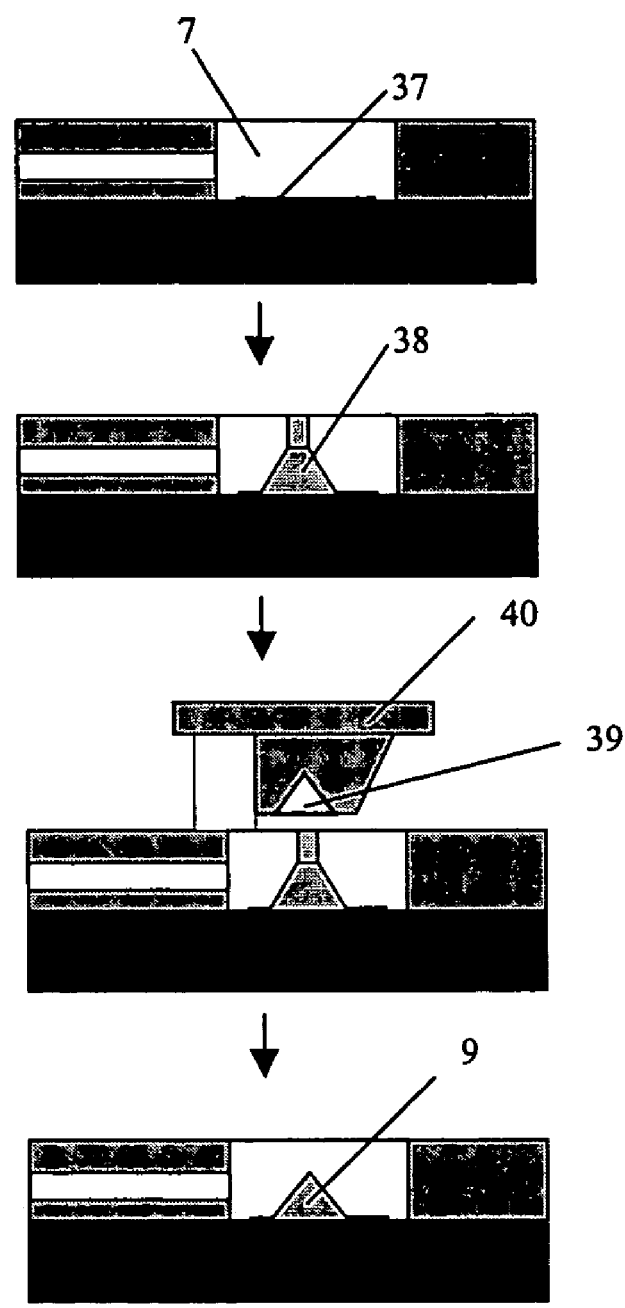
FIG. 19 shows a method of forming a micropyramid mirror by means of a silicon etch-pit mold.

To fabricate light monitor chip 20, the material for lower clad layer 33 and core layer 34 for silica glass waveguide formation are formed on silicon substrate 1 by a chemical vapor deposition method as shown in FIG. 18. Then, after patterning the core layer into the required shape, upper clad layer 36 is formed on patterned core layer 35, thereby completing the formation of main waveguide 2 and auxiliary waveguide 6. A resist is then applied to the surface, following which the resist is removed only from the rectangular area between the waveguides that is to be processed into a cavity. The core and clad layers are then etched by reactive ion etching to the depth of the substrate to form cavity 7. Gold sputtered film 37, which is to serve as the metal pad for mounting a mirror, is then formed on the bottom surface of this cavity as shown in FIG. 19. A gold bump 38, which is to serve as the material for forming a mirror is then inserted onto the bottom of this cavity by bonding a gold wire. The effect of both thermocompression bonding and ultrasonic bonding was employed for securing the gold bump 38 to the gold sputter film. Mold 40 was then produced as a mold for shaping this gold, this mold 40 being provided with a convex silicon portion having etch pit 39 formed of silicon (111) surfaces. Micropyramid mirror 9 can be formed by heating the substrate on which the gold bumps have been inserted to 300° C. and then pressing the gold bumps with the silicon mold. The above-described processes enable the fabrication of an optical circuit device having monitor functions.

When the substrate for forming waveguides is formed on a substrate other than silicon such as an organic substrate, a glass substrate, a ceramic substrate, or a crystal substrate, or when the material of the waveguides is a material other than glass such as an organic material or a crystal material, techniques such as a photolithographic process and reactive ion etching, chemical etching, or punching can be used to form cavities of a prescribed depth and size at the end portions of the directional couplers, and optical path conversion elements can then be mounted in these cavities to enable diversion of the optical path outside the plane on which the waveguides are formed. In addition, the method of diverting the optical paths by mounting optical path conversion elements in the cavities can also be applied to the waveguides for propagated light, and monitoring can also be realized by diverting the optical paths of only a portion of the propagated light that is transmitted on a multiplicity of channels.

It was found that gold and aluminum, which are easily pliable and feature high reflectance, were ideal as the material for forming the mirrors. In particular, it was found that the reflectance of a mirror that is formed from a metal containing at least 90% gold was extremely high at 95% or more, and was therefore superior for use as a mirror.

WORKING EXAMPLE 12

Figure 20:
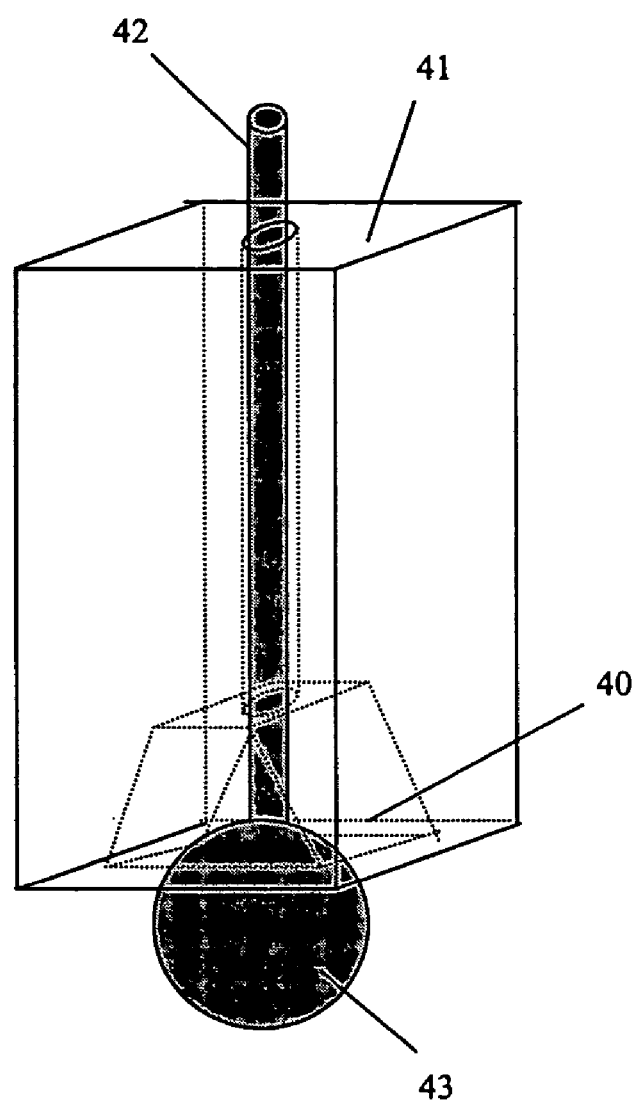
FIG. 20 shows a capillary tool capable of simultaneous forming and bonding of a mirror material.
Figure 21:
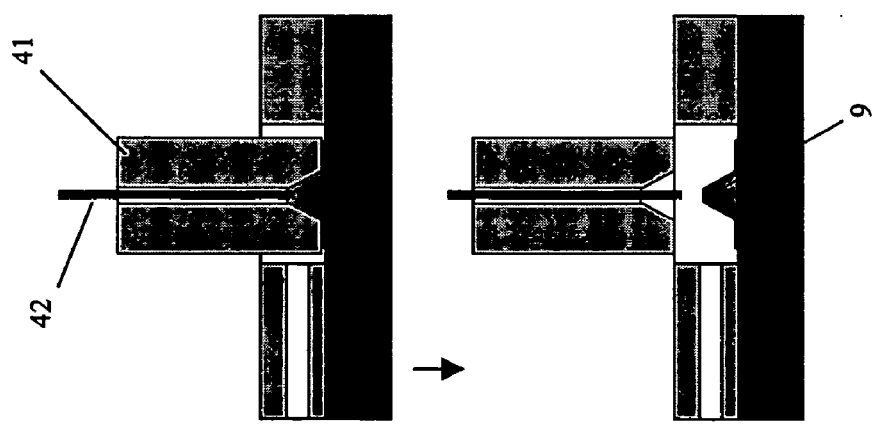
FIG. 21 shows the installation of a micropyramid mirror in a cavity by means of the capillary tool shown in FIG. 20.

When inserting a gold bump inside a cavity by gold wire bonding, the use of capillary tool 41, which is provided with both a capillary tool for bonding and mold 40 for forming as shown in FIG. 20, enables formation of the micropyramid mirror at the same time as the insertion of the gold bump. Gold wire 42 having a diameter of 25 µm is first passed through capillary tool 41, an electrical discharge is generated between an electric torch and the gold wire to form initial gold ball 43 having a diameter of 50 µm. The gold ball is then jammed between the mold of the capillary tool and the bottom surface of the cavity as shown in the sectional view of FIG. 21 and bonded by thermocompression to the gold pad that has been formed on the bottom surface of the cavity. Drawing the capillary tool upward enables cutting at the demarcating portion of micropyramid mirror 9 that has been formed and gold wire 42. In the present example, the height of the micropyramid from the bottom of the cavity was 30 µm. The interior of the mold has been smoothened to ±10 nm, whereby a mirror plane is realized on the surface of the micromirror after the press-bonding. The present example showed that this mirror surface could reflect upward the light having a wavelength of 1.55 µm emerging from the waveguide, and it was thus found that this construction can be applied as an optical path conversion element. The same results were obtained when a similar experiment was carried out using aluminum wire instead of gold wire.

WORKING EXAMPLE 13

Figure 22:
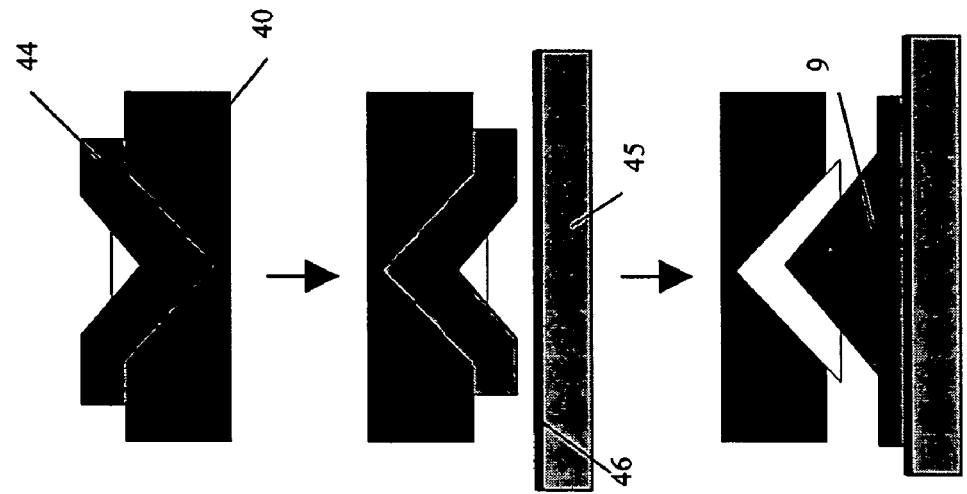
FIG. 22 shows the formation of a micropyramid mirror by the transfer and forming of thick-film gold plating.

Instead of inserting the base material for forming a mirror into the cavity, the base material can be filled inside the forming mold in advance. As shown in FIG. 22, a thick film of gold plating 44 is formed inside an etch-pit in silicon mold 40. This mold in which a gold film is formed is pressed against the mirror mounting position of metal pad 46 on optical circuit substrate 45 to effect thermocompression of the gold film, whereby micropyramid mirror 9 is formed. By making the thickness of the plate film equal to the depth of the etch-pit, the space inside the mirror is completely filled by gold during the transfer, and a mirror without any interior void can be formed.

WORKING EXAMPLE 14

Figure 23:
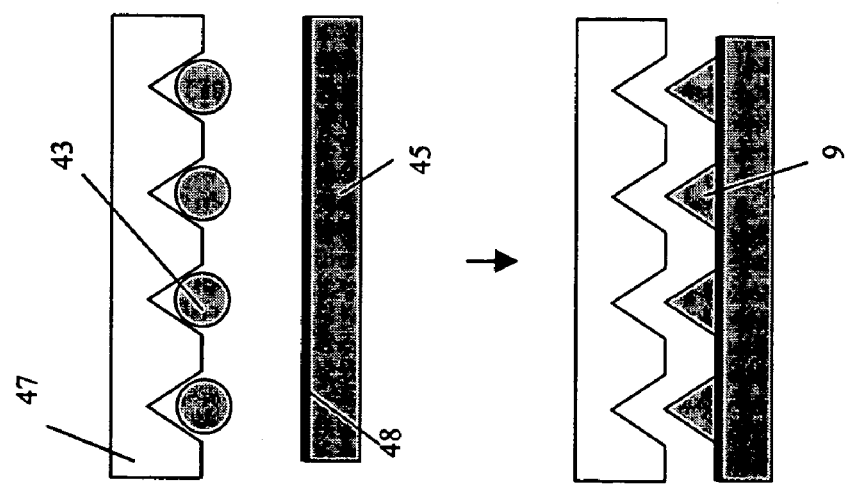
FIG. 23 shows the formation of micropyramid mirrors by forming gold balls with a glass mold.

As shown in FIG. 23, glass mold 47 was prepared in which a diamondlike carbon film was formed to a thickness of 0.1 µm as a lubricating film on the surface. Gold balls 43 having a volume that matches the volume of the mold are inserted in advance in the mold. The temperature of optical circuit substrate 45 composed of an organic material is heated to 250° C., which is within the range of the temperature endurance of the organic substrate, and the gold balls are pressed against Au—Sn solder film 48 to form in the shape of the mold. The shaped gold balls are soldered to the substrate, whereby micropyramid mirrors 9 can be mounted at prescribed positions on the substrate. It was found that metal does not bond to the diamondlike carbon film and therefore excellent peelabilty can be obtained. In a different experiment, it was found that when a diamondlike carbon film was formed on a mold made from stainless steel, this mold similarly exhibited excellent peelability after shaping a metal material.

WORKING EXAMPLE 15

Figure 24:
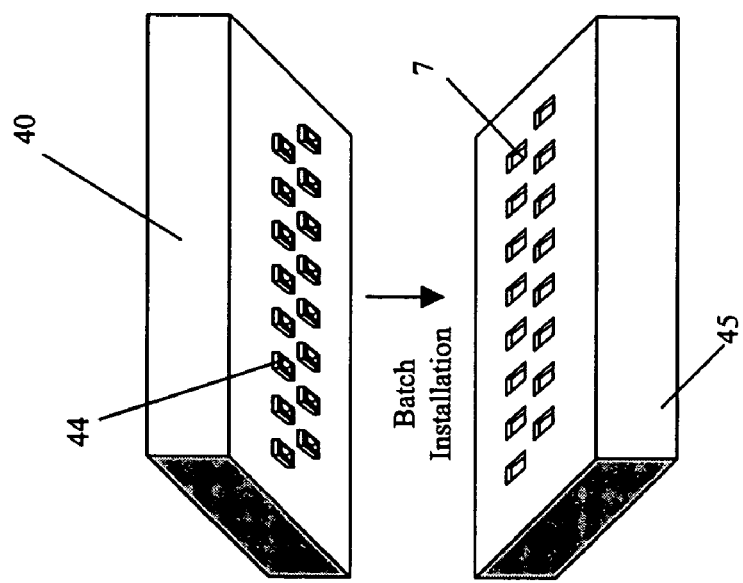
FIG. 24 shows the batch installation of micromirrors by means of multi-pit mold in the convex portions of silicon.

As shown in FIG. 24, a plurality of protruding parts (in the present example, forty protruding parts) are provided on silicon mold 40 and a thick gold-plate film is formed in each of etch-pits that have been formed inside these protruding parts (in the figure, only 16 are shown). These protruding parts are formed in correspondence to the positions of cavities 7 in optical circuit substrate 45. Gold pads are formed on the bottoms of the cavities. The optical circuit substrate is heated to 250° C., the mold having thick gold-plate films 44 inside the etch-pits is inserted into the cavities (40 cavities in the present example) in one operation, and heat molding is carried out. In this way, the plurality of micropyramid mirrors (forty mirrors in the present example) can be installed inside the cavities in one operation. In the present working example, testing was conducted to determine if, after molding, all of the micropyramid mirrors could be used as optical path conversion elements, and it was found that the roughness of the molded metal surface was ±10 nm and that a reflectance of 95% or more could be obtained for light having a wavelength of 1.55 µm.

WORKING EXAMPLE 16

Figure 26:
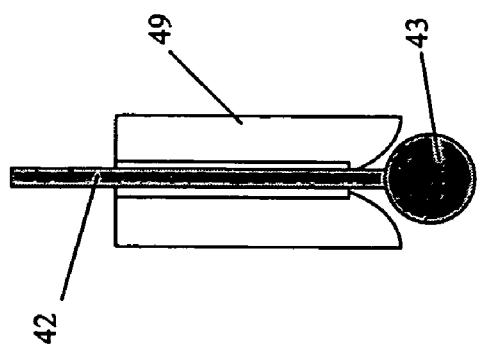
FIG. 26 shows a concave shaping tool capable of bonding mirror material and forming a concave mirror in one operation.
Figure 25:
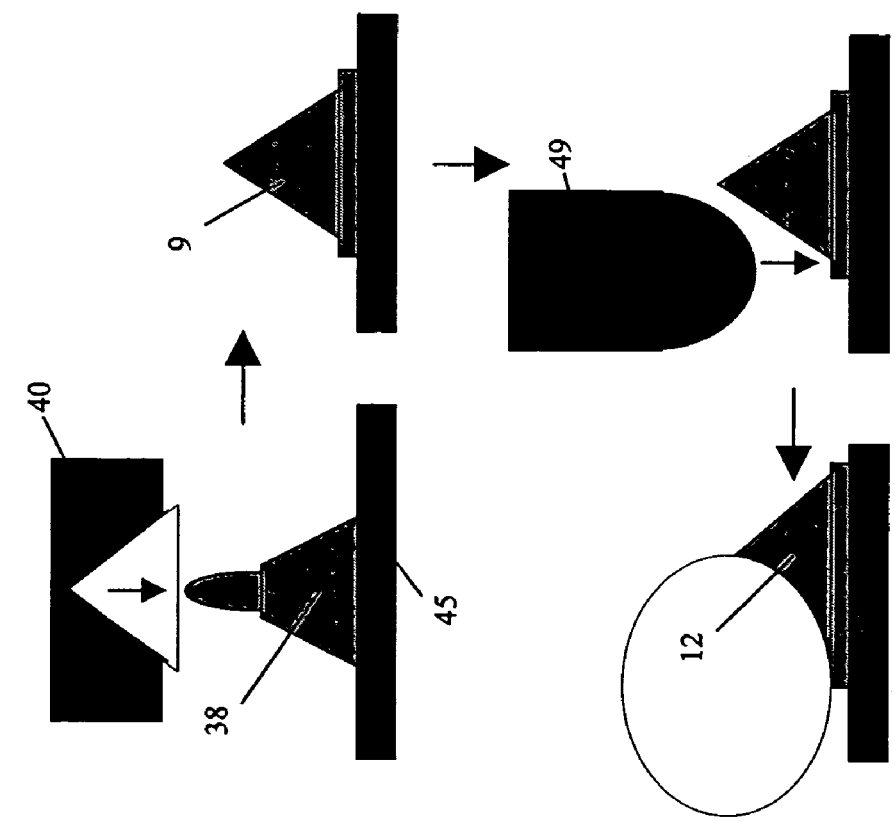
FIG. 25 shows the formation of a concave mirror by means of a concave shaping tool.

To form micropyramid mirrors that have the function of condensing reflected light, concave shaping tool 49 having a convex surface as shown in FIG. 25 can be prepared using a ruby single crystal. The surface of concave shaping tool 49 is finished to a mirror surface. Pressing this tool against micropyramid mirrors 9 heated to 250° C. enables formation of concave mirrors 12. The shape of the concave shaping tool can also be processed to a hemisphere or to an elliptic shape, whereby the focal point of the reflected light can be adjusted. In addition, as shown in FIG. 26, the use of a concave shaping tool that shapes a curved surface by pressing from both sides allows formation of a concave mirror at the same time when the mirror forming material is bonded to the substrate by wire-bonding.

WORKING EXAMPLE 17

Figure 28:
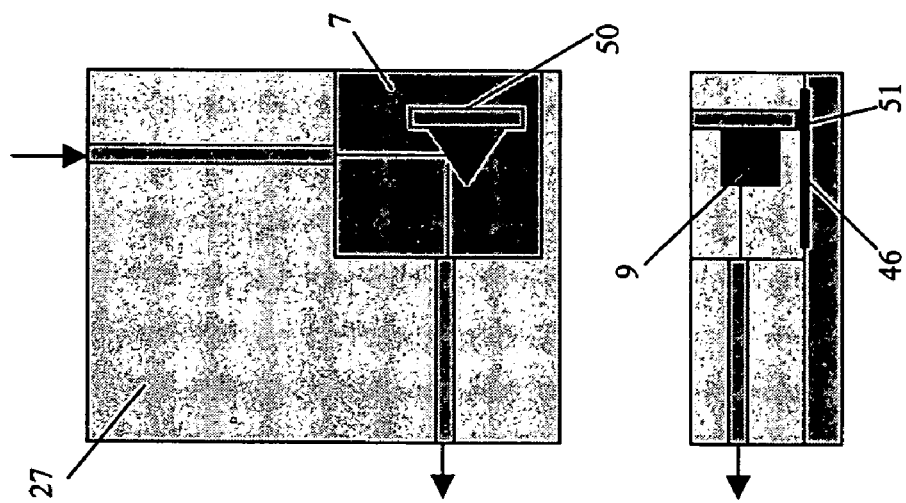
FIG. 28 shows a plan view of inter-waveguide optical coupling by means of a micropyramid mirror that has been installed on a submount substrate, and a sectional view showing a portion of the micropyramid mirror.
Figure 27:
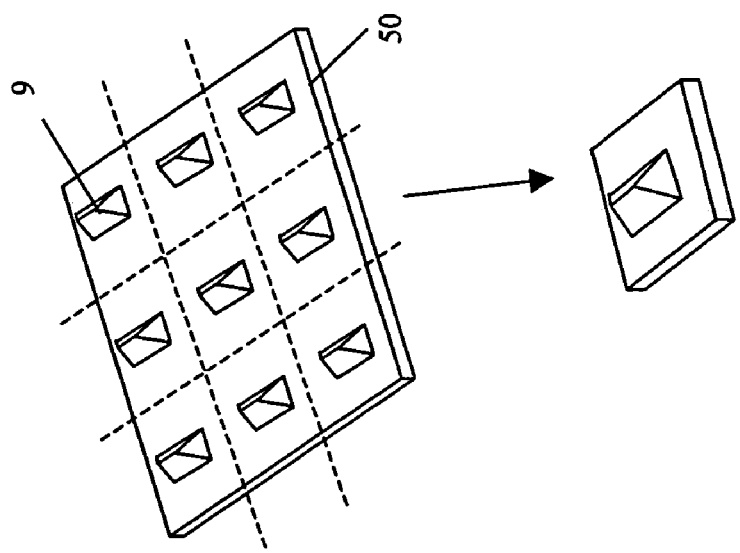
FIG. 27 shows micropyramid mirrors that have been formed on a submount substrate.

As shown in FIG. 27, micropyramid mirrors 9 are batch-formed in advance on submount substrate 50. After these submount substrates have been cut to a prescribed size, they can be mounted at prescribed positions of an optical circuit element. As shown in FIG. 28, installing a submount substrate in cavity 7 of optical circuit element 27 perpendicular to the optical circuit substrate allows two waveguides that mutually form an angle of 90 degrees in the plane of the optical circuit substrate and that open into the cavity to be coupled through micropyramid mirror 9. The use of a concave mirror in this micropyramid mirror enable condensing and coupling of light that emerges from a waveguide, and further, suppressing the coupling loss. Forming metal thin-film 51 in advance on the surface of the submont substrate to be fit to optical circuit element enables bonding to metal pads 46 on the mounting surface of the optical circuit element by thermocompression.

WORKING EXAMPLE 18

Since the angle of the silicon plane (111) to plane (100) is fixed at 54.7 degrees, the reflection orientation is also fixed if the silicon etch-pits are used as a mold for micropyramid mirrors. Thus, to allow free control of the angle of reflected light, the micropyramid mirrors 9 are mounted on submount substrate 50 that has been given a tilt as shown in FIG. 29, and this submount substrate is then mounted in an optical circuit device, whereby the light that emerges from a waveguide can be reflected at a prescribed angle with respect to the optical circuit substrate.

Figure 29:
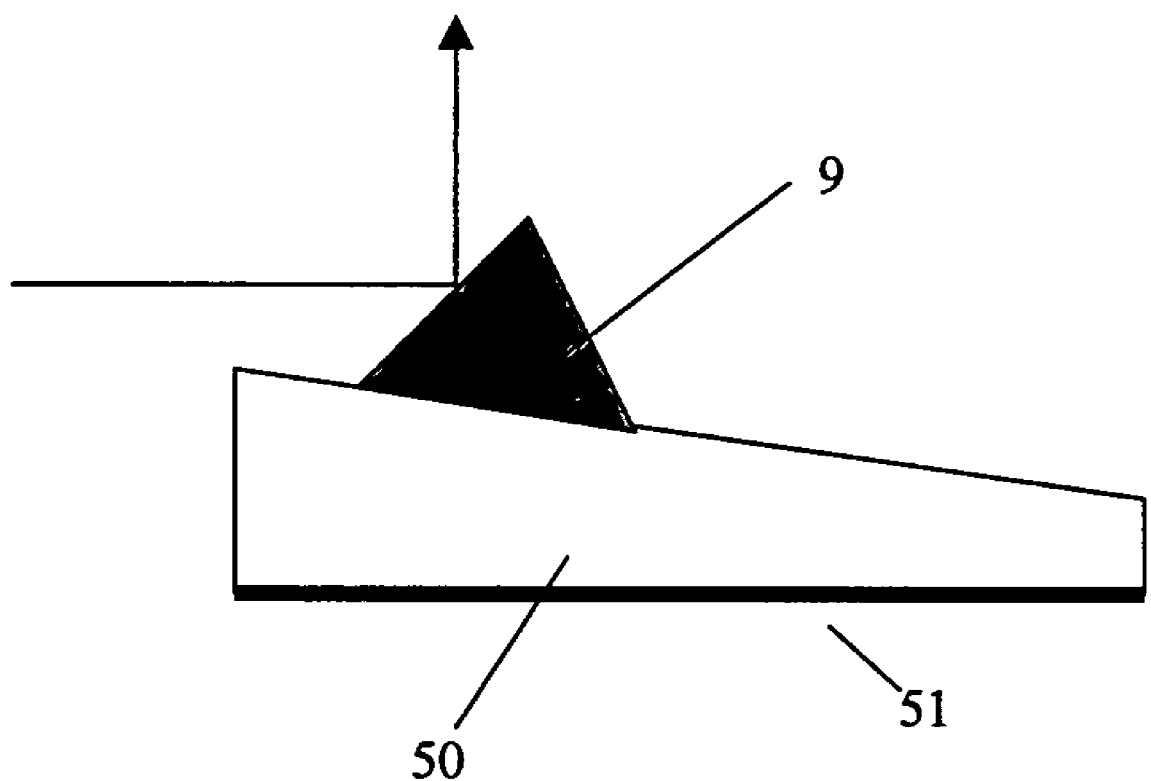
FIG. 29 shows a micropyramid mirror that is formed on a slanted submount substrate.

FIG. 29 shows a case in which light is reflected in a direction perpendicular to the direction of incidence. Metal thin-film 51 is formed on the bottom surface of this submount substrate 50, and the submount substrate can therefore be easily bonded to metal pads at the mirror mounting position of the optical circuit element by thermocompression bonding, ultrasonic bonding, or soldering.

Potential for Industrial Use

The optical circuit element and optical circuit device according to the present invention enable a portion of the propagated light that is propagated in arrayed waveguides, in which two or more waveguides are formed, to be derived above the waveguide substrate as monitor light and then photodetected. This monitor light allows monitoring of the light intensity, optical signal and optical wavelength of each channel; and a high-performance optical circuit device can therefore be realized by feed-back of a signal to an element for adjusting multiplexing/demultiplexing light, an optical attenuator or optical amplifier, or a temperature regulator. In addition, by forming a monitor chip integrally with a chip having other functions, significant advantages can be obtained in terms of reduced mounting area and cost, and a compact, high-performance, and reliable optical circuit device can be realized. In addition, the micropyramid mirror of the present invention as well as the method of forming and mounting this micropyramid mirror can be widely applied for coupling light with electrical elements such as photodiodes or diode lasers and can reduce the size of an optical device, thereby contributing to realizing a compact and high-performance optical device. As described hereinabove, the present invention enables the realization of reliable, high-capacity, and high-speed optical communication, and can contribute greatly to the development of the information communication industry.

What is claimed is:

1. An optical circuit element comprising:
   a substrate,
   a main waveguide and at least one auxiliary waveguide, disposed in said substrate;
   wherein said at least one auxiliary waveguide is for branching a portion of the light that is propagated in said main waveguide,
   wherein said at least one auxiliary waveguide has a receiving end for receiving light from said main waveguide and a terminated end,
   wherein a cavity is disposed at the terminated end of said auxiliary waveguide, and a mirror is disposed in said cavity for reflecting light propagated in said auxiliary waveguide and transmitted into said cavity.

2. An optical circuit element according to claim 1, further including at least one photodetecting element for receiving light that is reflected by said mirror.

3. An optical circuit element according to claim 2, wherein said photodetecting element is disposed above said cavity.

4. An optical circuit element according to claim 2, wherein a space in said cavity in which an optical path between said terminated portion of said auxiliary waveguide and said photodetecting element is established is filled with a light-transmissive substance having a refractive index that is substantially similar to an effective refractive index of said auxiliary waveguide.

5. An optical circuit element according to claim 1, wherein said mirror is a concave surface.

6. An optical circuit element according to claim 2, wherein said photodetecting element monitors light intensity.

7. An optical circuit element according to claim 2, wherein said photodetecting element monitors the wavelength of light.

8. An optical circuit element according to claim 2, wherein said photodetecting element monitors an optical signal.

9. An optical circuit element according to claims 2, having two or more auxiliary waveguides for one main waveguide, each auxiliary waveguide serving to monitor the intensity of light, the wavelength of light or an optical signal.

10. An optical circuit element according to claim 1, wherein said branching means is a directional coupler or a Y-branching waveguide.

11. Arrayed optical circuit elements having a plurality of optical circuit elements each having a main waveguide on a substrate, wherein at least one optical circuit element is an optical circuit element according to claim 1.

12. Arrayed optical circuit elements according to claim 11, wherein the spacing of said main waveguides is wider at least at the positions at which cavities of auxiliary waveguides are provided than at other positions.

13. Arrayed optical circuit elements according to claim 11, wherein light from a plurality of adjacent auxiliary waveguides is transmitted into a single cavity, said light being reflected by at least one mirror that is provided in said cavity.

14. Arrayed optical circuit elements according to claim 13, wherein said at least one mirror provided in said cavity is a single mirror that reflects a plurality of light beams.

15. An optical circuit device including:
    at least one of an optical signal demultiplexing element and an optical signal multiplexing element; and
    said arrayed optical circuit elements according to claim 11.

16. An optical circuit device comprised: arrayed optical circuit elements having a plurality of optical circuit elements each having a main waveguide on a substrate, wherein at least one optical circuit element is an optical circuit element according to claims 6; and
    an optical processing element provided with a means for controlling the light intensity of an optical signal depending on the light intensity monitored by said at least one optical circuit element.

17. An optical circuit device according to claim 16, wherein said optical processing element has a means for attenuating or amplifying each optical signal.

18. An optical circuit element fabrication method for fabricating an optical circuit element comprising: a substrate, a main waveguide, at least one auxiliary waveguide for branching a portion of light that is propagated in said main waveguide, a cavity disposed at the terminated portion of said auxiliary waveguide, and a mirror installed in said cavity for reflecting light that is propagated in said auxiliary waveguide and transmitted into said cavity; said fabrication method comprising steps of:
    stacking a clad layer material and a core layer material on a substrate, patterning said core layer material, and then forming an upper clad layer to provide said main waveguide and said auxiliary waveguide;
    forming said cavity at the terminated portion of said at least one auxiliary waveguide by etching; and
    forming a mirror in said cavity;
    wherein said step of forming said mirror comprises steps of:
        providing mirror mounting material on the bottom surface of said cavity;
        inserting a mirror forming material on said mirror mounting material; and
        forming said mirror forming material through the use of a mold.

19. An optical circuit element fabrication method according to claim 18, wherein said step of inserting a mirror forming material in said cavity and said step of forming said mirror forming material through the use of a mold are performed at the same time.

20. An optical circuit element fabrication method according to claim 19, wherein said mold has a hole for charging the inside of the mold with mirror forming material.

21. An optical circuit element fabrication method for fabricating an optical circuit element comprising; a substrate, a main waveguide, at least one auxiliary waveguide for branching a portion of light that is propagated in said main waveguide, a cavity formed at the terminated portion of said auxiliary waveguide, and a mirror disposed in said cavity for reflecting light that is propagated in said auxiliary waveguide and directed into said cavity; said fabrication method comprising steps of:

stacking a clad layer material and a core layer material on a substrate, patterning said core layer materials, and then forming an upper clad layer to provide said main waveguide and said auxiliary waveguide;

forming said cavity at the terminated portion of said at least one auxiliary waveguide by etching; and forming said mirror in said cavity;

wherein said step of forming said mirror comprises steps of:

providing a mirror mounting material on the bottom surface of said cavity; and charging the inside of a mold with mirror forming material, and transferring said mirror forming material onto said mirror mounting material.

22. An optical circuit element fabrication method according to claim 21, wherein said mirror mounting material is a metal pad.

23. An optical circuit element fabrication method according to claim 22, further including a step of securing said metal pad and mirror forming material using at least one of the means of thermocompression bonding, ultrasonic bonding, solder bonding, and chemical bonding of said metal pad material and said mirror forming material.

24. An optical circuit element fabrication method according to claim 23, wherein said mold has surfaces created by anisotropic etching of a silicon crystal.

25. An optical circuit element fabrication method according to claim 24, wherein mirrors are formed simultaneously in a plurality of cavities using a plurality of molds.

26. An optical circuit element fabrication method according to claim 25, wherein said mirror forming material is a metal that contains at least 90% gold.

27. An optical circuit element fabrication method for fabricating an optical circuit element comprising: a substrate, a main waveguide, at least one auxiliary waveguide for branching a portion of light that is propagated in said main waveguide, a cavity formed at the terminated portion of said auxiliary waveguide, and a mirror disposed in said cavity for reflecting light that is propagated in said auxiliary waveguide and transmitted into said cavity; said fabrication method comprising steps of:

stacking a clad layer material and a core layer material on a substrate, patterning said core layer materials, and forming an upper clad layer to provide said main waveguide and said auxiliary waveguide;

forming said cavity at the terminated portion of said at least one auxiliary waveguide by etching; and forming said mirror in said cavity;

wherein said step of forming a mirror includes a step of:

arranging said mirror that has been mounted on a submount substrate.

28. An optical circuit element fabrication method according to claim 27, wherein said step of forming a mirror further includes a step of:

providing a mirror mounting material on the bottom surface of said cavity before said step of arranging a mirror that has been mounted on a submount substrate.

29. An optical circuit element fabrication method according to claim 27, wherein said submount substrate is composed of a metal, or has a substrate provided with a metal thin-film on its lower surface.

30. A mirror fabrication method for fabricating a mirror having a concave surface, wherein a mold is used that has a convex surface for forming a mirror according to claim 27.

31. A mirror fabrication method for fabricating a mirror having a concave surface, including a step of deforming the shape of a mirror that has been formed by a fabrication method according to claim 27 using a shaping tool having a convex surface to form the reflecting surface to a concave surface.

32. The optical circuit element according to claim 1, wherein said mirror has a mirror plane.

33. The optical circuit element according to claim 1, where said mirror has is formed of a predetermined forming material through the use of a forming mold having a prescribed shape.

34. The optical circuit element according to claim 1, wherein said mirror has a hemispherical surface.

35. The optical circuit element according to claim 1, wherein said mirror has an elliptical shape.

36. The optical circuit element according to claim 1, wherein said light-transmissive substance comprises a silicon gel synthesized by ring-opening polymerization of dimethylcyclohexane.

37. An optical circuit device comprising:

a plurality of optical elements according to claim 6; and an optical processing element, comprising:

a wave guide monitoring circuit for controlling a variable attenuator and a channel amplifier for adjusting the intensity of said light intensity detected in each optical circuit element.

38. An optical circuit element fabrication method according to claim 27, wherein the steps of forming a mirror that has been mounted on a submount substrate comprises:

preparing a glass mold having a mold volume with a lubricating film on the surfaces of said mold volume;

providing a mold material in said mold volume having the same volume as said mold volume;

providing an organic substrate;

providing a solder film on a surface of said organic substrate;

heating said organic substrate to a temperature within a range of temperature endurance of said organic substrate;

pressing said mold containing said mold material on said solder film whereby said mold material is soldered to said organic substrate.

39. The optical circuit element fabrication method according to claim 38, wherein said mold material comprises gold and said solder film comprises an Au—Sn material.

40. The optical circuit element fabrication method according to claim 38, wherein said lubricating film comprises a diamondlike substance.

* * * * *